United States Patent Office 3,256,276
Patented June 14, 1966

3,256,276
SUBSTITUTED SPIROIMIDES
Charles H. Grogan, Falls Church, Va., and Leonard M. Rice, Baltimore, Md., assignors to The Geschickter Fund for Medical Research, Inc., Washington, D.C., a corporation of New York
No Drawing. Filed Feb. 17, 1961, Ser. No. 89,939
7 Claims. (Cl. 260—247.1)

This invention relates to novel synthetic organic compounds having significant chemotherapeutic activity, to methods for their preparation and to novel intermediates useful in their preparation. More particularly, this invention relates to novel thiaza and oxazaspirane diones, their acid addition and quaternary salts; thiaza and oxazaspiranes, their acid addition and quaternary salts; and to novel oxygen and sulfur containing heterocyclic gem-diacetic and gem-carboxyacetic acids and their anhydrides.

The several inventions of the present application have a number of significant objects. A primary object of these inventions is to provide novel, physiologically active organic compounds and methods for their preparation, which compounds are characterized by their chemotherapeutic or medicinal properties and particularly by their pharmacological activity on the nervous and cardiovascular systems.

Another principal object of this invention is to provide novel thiaza and oxazaspiranes, their ring and N-substituted derivatives, simple acid addition and quarternary salts thereof, and novel methods for their preparation.

A further object of this invention is to provide novel thiaza and oxazaspirane diones, their ring and N-substituted derivatives, simple acid addition and quaternary salts theerof, and novel methods for their preparation.

Still another object of this invention is to provide novel organic acids containing sulfur or oxygen in a heterocyclic ring and further containing gem-diacetic or gem-carboxyacetic acid groups on this ring, and valuable anhydrides derived from these novel acids.

These and further objects of the several inventions presented in the instant application will become apparent from the following description.

Generally speaking, the valuable acids necessary for the synthesis of the pharmacologically active thiaza and oxazaspirane diones and thiaza and oxazaspiranes of the present invention are obtained by appropriate hydrolysis of the potassium cyanide addition products of α-heterocyclylidene-α-cyanoacetic esters, or the dicyanoimides. These intermediates are obtained by techniques well known in the art by condensation of one mole of the desired ketone with one or two moles of ethyl cyanoacetate or cyanoacetamide under the influence of basic catalysts such as piperidine or ammonia. The hydrolysis of the cyanide addition products of the ylidine ylidino esters yields the gem-carboxy-acetic acids and the hydrolysis of the dicyanoimides yields the gem-diacetic acids. These general methods are illustrated by Formulae 1 and 2 respectively:

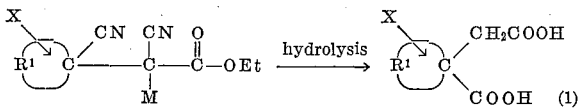

wherein X represents one or more atoms and/or radicals of the group consisting of hydrogen, alkoxy, alkyl, alkenyl, cycloalkyl, aryl (such as phenyl), a plurality of any of these, or any combination of these; $R^1$ represents S or O; and M represents a metal such as potassium or sodium.

The acids are then converted into the corresponding anhydrides by treatment with a large molar excess of acetic anhydride and may be purified by vacuum distillation after removal of the excess acetic anhydride by distillation, preferably under slightly reduced pressure (15–50 mm.).

The novel thiaza and oxazaspirane diones of the present invention are obtained by reacting the desired anhydride with a primary alkylamine; alkenylamine; cycloalkylamine; cycloalkenylamine; lower or di-lower alkyl or alkenyl aminoalkyleneamine or aminoalkenyleneamine; saturated heterocyclic amine in which the heterocycle is selected from the group consisting of morpholino, piperidino, pyrrolidino, piperazino, tetrahydrofurano and their lower alkyl or alkylene substituted derivatives; saturated heterocyclic alkylamine or alkenylamine in which the heterocycle is selected from the group consisting of morpholino, piperidino, pyrrolidino, piperazino, tetrahydrofurano and their lower alkyl or alkenyl ring-substituted derivatives; aralkyleneamine; aralkenyleneamine; arylamine; alkoxyalkyleneamine and alkoxyalkenyleneamine, and heating sufficiently to cyclize the amic acid thus formed to the imide or thiaza or oxazaspirane dione. A cyclizing temperature of about 140–240° C. is acceptable, with a temperature range of about 180–240° C. being preferred. Obviously, the amines utilized to form the diones may be further substituted without departing from the present invention.

The novel thiaza and oxazaspiranes of the present invention may be prepared by reducing the imides prepared above by suitable means to obtain the corresponding thiaza and oxazaspirane bases, which may then be converted by appropriate means into their simple acid addition and quaternary salts.

Formula 3 illustrates the general structural formula of the novel thiaza and oxazaspirane diones of the present invention:

$$\begin{array}{c} X \\ \diagdown \\ R^1 \ A \ C \ B \ N-Y-R \\ \diagup \\ O \end{array} \quad (3)$$

In this formula, the azaspirane-dione structure consists of six essential elements: (a) the ring A; (b) the ring B; (c) the spiro carbon atom cconnecting rings A and B; (d) the substituent X on ring A; (e) the substituent $R^1$ in ring A; and (f) the substituent —Y—R on ring B.

Ring A of the basic azaspirane-dione structure shown above comprises a mono or bicyclic ring of at least 5 atoms. While there is no particular upper limit to the number of atoms in ring A, a ring of from 5 to 15 atoms is preferred. Ring B of this structure comprises a saturated heterocyclic ring containing 5 or 6 atoms, one of which is nitrogen, the carbon atoms alpha, alpha' to the nitrogen atom being carbonyl carbons. As stated, element (c) of the basic structure is the spiro carbon atom, from which the name "spiro" is derived, connecting rings A and B. Element (d), namely substituent X on ring A, represents one or more atoms and/or radicals of the group consisting of hydrogen, alkoxy, alkyl, alkenyl, cycloalkyl, aryl (such as phenyl), a plurality of any of these, or any combination of these. Element (e), $R^1$, is either O or S. Element (f) of the basic structure, the substituent —Y—R, represents the residue from the reaction of one of the primary amines set forth above with a suitable anhydride after abstraction of the two hydrogens from the amine by the anhydride oxygen. In this substituent, Y is an alkylene or alkenylene group of 0–6 carbon atoms and R is selected from the group consisting of alkyl; alkenyl; cycloalkyl; cycloalkenyl; lower or di-lower alkyl or alkenyl amino; saturated heterocyclic selected from the group consisting of morpholino, piperidino, pyrrolidino, piperazino, tetrahydrofurano and their lower alkyl or alkenyl substituted derivatives; aryl and alkoxy. Examples of aryl groups which may be employed are phenyl, pyridyl, furfuryl, quinolyl, naphthyl, etc.

Obviously, ring A and the groups comprising X and R may be substituted in various ways without departing from the present invention.

Formula 4 illustrates the general structural formula of the novel thiaza and oxazaspiranes of the instant invention:

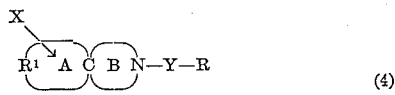
(4)

In this formula, all elements have the same meaning described in connection with Formula 3 for the corresponding thiaza and oxazaspirane diones, the only difference being that the two carbonyl oxygen atoms alpha, alpha' to the nitrogen of ring B have been removed by reduction.

In addition to the thiaza and oxazaspirane diones set forth by Formula 3 and the corresponding thiaza and oxazaspirane bases described by Formula 4, the instant invention additionally contemplates the treatment of the thiaza and oxazaspirane diones (Formula 3) and the thiaza and oxazaspiranes (Formula 4) to form their simple acid addition and quaternary salts.

Formula 5 illustrates the type and site of acid addition and quaternary salt formation in the cases of the thiaza and oxazaspirane diones:

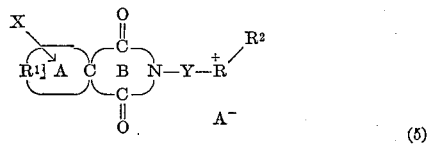
(5)

Obviously, such salt formation cannot occur in the case of the diones unless the N-substituent contains a basic nitrogen atom, since the dione nitrogen will not react to form either simple acid addition or quaternary salts. Acid addition and quaternary salt formation, therefore, is limited in the case of the thiaza and oxazaspirane diones to those having ring N-substituents containing basic nitrogen atoms.

In all cases, $A^-$ is a non-toxic acid anion, such as chloride, iodide, bromide, sulfate, acetate, phosphate, maleate, mucate, tartrate and the like, and $R^2$ is selected from the group consisting of alkyl and alkenyl radicals containing from 1 to 12 carbon atoms and hydrogen. X has the significance set forth in connection with Formula 3.

Formula 6 illustrates simple acid addition and quaternary or bis-quaternary salt formation in the cases of the thiaza and oxazaspiranes:

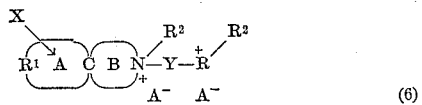
(6)

In contradistinction to the case of the diones (Formula 5), simple acid addition and quaternary salts may be formed in all cases on the ring B nitrogen regardless of the nature of side chain —Y—R, since the ring B nitrogen is now a basic tertiary amine nitrogen. Salt formation may be made to take place on both the ring B nitrogen and on any nitrogen contained in the ring B N-substituent by using an excess of the salting medium and proper temperature control. $A^-$, $R^1$, $R^2$ and X have the same significance as defined in connection with Formula 5.

In general, those non-toxic salts of the diones (Formula 5) and the basic spiranes (Formula 6) which are soluble in water or in other well-tolerated solvents are particularly useful for therapeutic purposes due to the ease of administration of the salts in their dissolved form. In addition, other non-toxic salts may also be used depending upon the route of administration desired.

The compounds of the present invention are useful either as intermediates (i.e., the acids and anhydrides for preparing the diones; the diones for preparing the free bases) or as medicinal agents. All of the diones and free bases possess central nervous system activity. The heterocyclic bases and lower and di-lower alkyl (alkenyl) amino bases possess anti-histaminic activity. The bis-quaternary salts of these compounds possess hypotensive activity. For example, the compound of Example 6–E, 3-(3-dimethylaminopropyl)-8,9-dimethyl-9-oxa-3-azaspiro[5.5]-undecane (in the dihydrochloride form, for ease of administration) has sedative properties in doses of 50 mg. intramuscularly or 100 mg. p.o. once or twice daily and its toxicity is over 300 mg./kg. The bis-quaternary salt of this base (Example 6–F) produces a lowering of blood pressure in doses of 10–25 mg. intramuscularly or intravenously and has a toxicity of more than 300 mg./kg. The alkyl, alkylene, cycloalkyl, cycloalkylene and alkoxy bases are stimulants. For example, the compound of Example 9–C, 2-allyl-7-thia-2-azaspiro[4.4]nonane (in the hydrochloride form, for ease of administration), is a central stimulant. The alkyl thia and oxazaspirane diones (in particular, the N-allyl derivatives) are relaxants and, in higher does, are hypnotics. Thus, the compound of Example 9–A, 2-allyl-7-thia-2-azaspiro[4.4]nonane-1,3-dione, is a muscular relaxant. For this purpose, administration of 25–50 mg. once or twice daily is efficacious. The $LD_{50}$ intraperitoneally in rats of this compound is greater than 250 mg./kg. 2-allyl-8-oxa-7,9-dimethyl-2-azaspiro[5.4]decane-1,3-dione is a potent muscular relaxant in doses of 50–100 mg. intramuscularly once or twice daily and has been found to be particularly useful in controlling spasms of hemiplegics. In intermediate dosage levels, it produces relaxation and sedation and therefore possesses tranquilizing properties. In higher doses of 250–300 mg., it is a potent hypnotic. Its toxicity is extremely low, viz., over 800 mg./kg.

The following examples will serve to illustrate the novel compounds of the present invention and the novel procedures by which they are produced.

*Example 1.—3-thiacyclopentane-1-carboxy-1-acetic acid and anhydride*

A. *Ester.*—60 gm. of tetrahydrothiophene-3-one was mixed with 1 molar equivalent, 67 gm. of ethyl cyanoacetate and 1 ml. of piperidine was added to the mixture. The mixture was stoppered tightly and allowed to stand 1 week at room temperature. The reaction mixture was poured into 1 liter of ½ saturated aqueous sodium chloride containing 1 ml. conc. HCl. This was mixed thoroughly in a separatory funnel and extracted three times with 300 ml. portions of ether. The ether extracts were dried over sodium sulfate, the ether stripped and the residue fractionally distilled in vacuo, yielding 54 gm. of ethyl alpha-cyano-alpha (3-thiacyclopentylidine) acetate (B.P. 106–111° C./0.35 mm.).

B. *Cyanide addition product.*—54 gm. of the above ester was placed in a 500 ml. flask, dissolved in 250 ml. alcohol and a solution of 40 gm. of potassium cyanide in 85 ml. of water added. The mixture was permitted to stand at room temperature for 72 hours and then stripped of all solvents under reduced pressure until a dried powder remained.

C. *Acid.*—200 ml. of concentrated hydrochloric acid was added to the powder through a long condenser and the mixture was refluxed for 24 hours, cooled in the ice box and filtered, yielding 45 grams of crude acid with a brownish tint. This was redissolved in a minimum of boiling water, treated with decolorizing charcoal, filtered and cooled. The 3-thiacyclopentane-1-carboxy-1-acetic acid was obtained as long white needles in a quantity of 37.5 gm. (M.P. 156–157° C.). When the filtrate was combined with the hydrochloric acid filtrate mother liquor and extracted in a continuous ether extractor for 24 hours, another 5 gm. of acid was obtained. On recrystallization from acetone-ligroin, the pure acid melted at 157–158° C.

D. *Anhydride.*—Refluxing 42 gm. of the acid from (C) above with 200 ml. of acetic anhydride for 2 hours, stripping off the acetic anhydride at the water pump, and distillation of the residue in vacuo yielded 35 gm. of 3-thiacyclopentane-1-carboxy-1-acetic anhydride (B.P. 124–130° C./0.25 mm.; M.P. 79–80° C.).

*Example 2.—3,5-dimethyl-4-oxacyclohexane-1,1-diacetic acid and anhydride*

A. *Dicyanoimide.*—Condensation of 66 gm. of 3,5-dimethyltetrahydrogamma-pyrone with 2 molar equivalents (117 gm.) of ethyl cyanoacetate in an excess of saturated anhydrous ammonia in absolute alcohol for 5 days at 5° C. yielded 87 gm. of the ammonium salt of the dicyanoimide. This was dissolved in a minimum of boiling water and acidified with conc. hydrochloric acid. Cooling overnight in the refrigerator and filtering yielded 63 gm. of the dicyanoimide (M.P. 230–231° C.). Recrystallization from water resulted in a product having a M.P. of 231–232° C.

B. *Acid.*—Hydrolysis of the dicyanoimide with 40–60% sulfuric acid resulted in poor yields of the desired acid due to destruction of the pyrone ring by the sulfuric acid. The desired acid was obtained by stepwise hydrolysis as follows: The imide was boiled for several hours with a 2% aqueous solution of sodium hydroxide until ammonia ceased to be evolved. This procedure ruptured the imide ring. The resultant solution was concentrated under reduced pressure and the hydrolysis completed either by (a) boiling with 15% NaOH or (b) concentrated HCl. The acid was extracted by continuous ether extraction overnight. This yielded the tetracarboxylic acid mixed with the desired dicarboxylic acid. The mixture of acids was heated slowly until effervescence of carbon dioxide ceased (decarboxylation of the tetracarboxylic acid), cooled and recrystallized from water after treating with decolorizing charcoal. The crude acid melted at 137–141° C. by either alternative hydrolysis procedure. On recrystallization from acetone-petroleum ether, it melted at 155–156° C.

C. *Anhydride.*—The anhydride was formed by treating the acid from B above with excess acetic anhydride and vacuum distilling the residue. The resultant anhydride had a B.P. of 132–137° C./0.04 mm. and a M.P. of 110–111° C.

*Example 3.—3,5-dimethyl-4-oxacyclohexane-1-carboxy-1-acetic acid and anhydride*

A. *Ester.*—29 gm. of 3,5-dimethyltetrahydro-gamma-pyrone and one molar equivalent of ethyl cyanoacetate and 0.1 ml. of piperidine were heated to boiling and stoppered. Each day for 5 days the procedure of heating and adding 0.1 ml. of piperidine was repeated. The ester crystallized in large blocks which were filtered off and washed with petroleum ether. It melted at 103–105° C. and on recrystallization from acetone-water melted at 104–104.5° C. (yield 31 gm.).

B. *Cyanide addition product.*—31 gm. of the ester from A above dissolved in 450 ml. alcohol (this ester was rather insoluble in alcohol) was treated with 10 gm. of potassium cyanide in 20 ml. of water. After five days, the mixture was stripped under reduced pressure until a dry powder remained.

C. *Acid.*—Hydrolysis of the cyanide addition produced from B above with 350 ml. of conc. HCl for 24 hours, stripping to dryness and repeated extraction of the residue with boiling ethyl acetate yielded 21 gm. of the acid (M.P. 196–197° C.). Recrystallization from ethyl acetate resulted in a product having a M.P. of 196–197° C.

D. *Anhydride.*—Conversion of the acid to the anhydride as previously described in Example 2–C yielded 16 gm. of anhydride (B.P. 98–105° C./0.02 mm.; M.P. 68–70° C.).

*Example 4.—4-thiacyclohexane-1-carboxy-1-acetic acid and anhydride*

A. *Ester.*—The ester was prepared as described in Example 3–A from 30 gm. of thiotetrahydropyrone-4 and one molar equivalent of ethylcyanoacetate and 0.3 ml. piperidine (yield 39 gm.; B.P. 111–115° C./0.03 mm.).

B. *Cyanide addition product.*—The cyanide addition product was prepared from 38 gm. of the ester and 13 gm. KCN in alcohol-water in the manner described in Example 3–B.

C. *Acid.*—The acid was formed through hydrolysis of the cyanide addition product from B above with concentrated HCl in the manner described in Example 3–C (yield 32 gm. acid; M.P. 130–132° C.; recrystallized from water, M.P. 132–133.5° C.).

D. *Anhydride.*—The anhydride was formed from the acid from C above with acetic anhydride (B.P. 142–147° C./0.05 mm.; M.P. 93–95° C.; recrystallized from ethyl acetate-ligroin, M.P. 94–95° C.).

*Example 5*

A. *Imide [2-(3 - dimethylaminopropyl) - 8 - oxa - 7,9-dimethyl-2-azaspiro[5.4]decane-1,3 - dione].*—15 gm. of 3,5-dimethyl-4-oxacyclohexane-1-carboxy-1 - acetic anhydride was mixed with 8.43 gm. of 3-dimethylaminopropylamine and slowly heated to 180–200°, at which temperature it was maintained for 2 hours and then distilled in vacuo to yield 19 gm. of the title imide (B.P. 124–128° C./0.05 mm.).

B. *Imide hydrochloride.*—The hydrochloride was formed from 2 gm. of the imide of A with excess alcoholic-HCl in ethyl acetate (M.P. 197–198° C.).

C. *Imide methiodide.*—The methiodide was formed by refluxing the imide of A with excess methyliodide in ethyl acetate, cooling and adding anhydrous ether (M.P. 184–185° C.).

D. *Base [2-(3-dimethylaminopropyl)-8 - oxa - 7,9 - dimethyl-2-azaspiro[5.4]decane].*—Reduction of 16 gm. of the imide of A with 15 gm. lithium aluminum hydride in anhydrous ether, stirring 4 hours, decomposition with water and drying over anhydrous sodium sulfate, stripping the ether and distillation in vacuo yielded 13.1 gm. of the title base (B.P. 89–92° C./0.05 mm.).

E. *Base dihydrochloride.*—Treatment of the base from D in isopropyl alcohol with excess alcoholic-HCl and precipitation with ether yielded the dihydrochloride (M.P. 283–284° C.).

F. *Base dimethiodide.*—Refluxing the base from D with excess methyl iodide in ethyl acetate-isopropyl alcohol mixture, cooling and addition of absolute ether yielded the dimethiodide (M.P. 261–262° C.).

*Example 6*

A. *Imide [3-(3-dimethylaminopropyl)-8,10 - dimethyl-9-oxa-3-azaspiro[5.5]-undecane-2,4 - dione].*—Treatment of the anhydride from Example 2 with 3-dimethylaminopropylamine, as described in Example 5–A, yielded the desired imide (B.P. 136–142° C./0.025 mm.).

B. *Imide hydrochloride.*—The imide hydrochloride, formed as described in Example 5–B, had a M.P. of 163–164° C.

C. *Imide methiodide.*—The imide methiodide, formed as described in Example 5–C, had a M.P. of 266–267° C.

D. *Base [3 - (3 - dimethylaminopropyl) - 8,10 - dimethyl-9-oxa-3-azaspiro[5.5]-undecane].*—The base was prepared by lithium aluminum hydride reduction of the imide from A above, as described in Example 5–D (B.P. 98–101° C./0.025 mm.).

E. *Base dihydrochloride.*—The dihydrochloride was prepared as described in Example 5–E (M.P. 294–295° C.).

F. *Base dimethonium salt.*—The dimethonium salt was prepared as described in Example 5–F (M.P. 279–280° C.).

Example 7

A. *Imide [2 - (3 - dimethylaminopropyl) - 8 - thia-2-azaspiro [5.4] decane-1,3-dione].*—Treatment of 0.1 M of the anhydride from Example 4 with 0.11 M of 3-dimethylaminopropylamine, as described in Example 5–A, yielded the desired imide in 97% yield (B.P. 141–146° C./0.025 mm.).

B. *Imide hydrochloride.* — The hydrochloride was formed as described in Example 5–B (M.P. 199–200° C.).

C. *Imide methiodide.*—The imide methiodide was formed at room temperature with one molar equivalent of methyl iodide in ethyl acetate and precipitated with anhydrous ether. In order to quaternize the side chain nitrogen atom and avoid excessive conversion of the ring sulfur to the sulfonium salt, it was necessary to keep the reaction mixture cool and avoid an excess of quaternizing alkyl ester (M.P. 187–190° C.).

D. *Base [2 - (3 - dimethylaminopropyl) - 8 - thia - 2 - azaspiro [5.4] decane].*—The base was prepared by reduction of the imide from 20 gm. of the imide of A above, as described in Example 5–D (B.P. 97–103° C./ 0.025 mm.; yield 88%).

E. *Base dihydrochloride.*—The dihydrochloride was prepared as described in Example 5–E (M.P. 276–277° C.).

Example 8

A. *Imide [2 - (3 - morpholinopropyl) - 7 - thia - 2 - azaspiro [4.4] nonane - 1,3 - dione].*—The imide was prepared by treating 8.6 gm. (0.05 M) of the anhydride from Example 1 with 0.055 mole of 3-morpholino-propylamine, as described in Example 5–A, and boiling at 178–183° C./ 0.3 mm. (M.P. 64–65° C.; 87% yield).

B. *Imide hydrochloride.*—The hydrochloride was prepared as described in Example 5–B (M.P. 188–189° C.).

C. *Base [2 - (3 - morpholinopropyl) - 7 - thia - 2 - azaspiro [4.4] nonane].*—The base was prepared in 93% yield from the imide of A above, as described in Example 5–B (B.P. 128–132° C./0.025 mm.).

D. *Base dihydrochloride.*—The dihydrochloride was prepared as described in Example 5–E (M.P. 253–254° C.).

Example 9

A. *Imide [2 - allyl - 7 - thia - 2 - azaspiro [4.4] nonane-1,3-dione].*—The imide was prepared from 8.6 gm. of the anhydride from Example 1 and 5 gm. of allyl amine, as described in Example 5–A (B.P. 107–110° C./0.25 mm.; M.P. 50–51° C.; 91% yield).

B. *Base [2-allyl-7-thia-2-azaspiro [4.4] nonane].*—The base was prepared as described in Example 5–D from the imide from A above (92% yield; B.P. 50–51° C./0.2 mm.).

C. *Base hydrochloride.*—The hydrochloride was prepared from the base from B above as described in Example 5–E (M.P. 98–98.5° C./very hygroscopic).

Example 10

A. *Imide [2- (4 - methylbenzyl) - 7 - thia - 2 - azaspiro [4.4] nonane - 1,3-dione].*—The imide was prepared from 8 gm. of the anhydride from Example 1 and 5.6 gm. of 4-methylbenzylamine, as described in Example 5–A, except that the cyclization was completed by heating to 240° C., as has been frequently found necessary with aryl and aralkylamines (B.P. 165–175° C./0.02 mm.). The imide was very viscous and solidified on slurrying with absolute ether (M.P. 69–70° C.; yield 11.5 gm., 91%).

B. *Base [2-(4-methylbenzyl)-7-thia-2 - azaspiro[4.4] noane].*—The base was prepared by reduction of the imide from A as described in Example 5–D (B.P. 110–115° C./0.05 mm.).

C. *Base hydrochloride.*—The hydrochloride was prepared as in Example 5–E (M.P. 204–205° C.).

Example 11

A. *Imide [2-methyl-7-thia-2-azaspiro[4.4]nonane-1,3-dione].*—14 gm. of the anhydride from Example 1, when treated with excess aqueous 25% methylamine and heated slowly to 160° C., solidified on cooling and yielded 14 gm. (91% yield) of the desired imide (M.P. 62–64° C.). Recrystallization from acetone-water resulted in a product with a melting point of 64–65° C.

Example 12

A. *Imide [2-allyl-8-oxa-7,9 - dimethyl-2-azaspiro[5.4] decane-1,3-dione].*—Treatment of 15 gm. of the anhydride from Example 3 with excess allyl amine, heating slowly to 160° C. and distillation in vacuo yielded the desired imide (B.P. 87–89° C./0.13 mm.; 16 gm., 93%; M.P. 55–56° C.).

B. *Base [2 - allyl-8-oxa - 7,9 - dimethyl-2-azaspiro[5.4] decane].*—Reduction of 11 gm. of the imide from A above with lithium aluminum hydride yielded the title base (B.P. 41° C./0.15 mm.; 8.5 gm., 88%).

C. *Base hydrochloride.*—Treatment of the base dissolved in ether with gaseous hydrogen chloride yielded the hydrochloride (M.P. 186–187° C.). Recrystallization from ethyl acetate-ether resulted in a product having a M.P. of 187–188° C.

D. *Base butyliodide [2-allyl-2-butyl-8-oxa-7,9-dimethyl-2-azaspiro[5.4]decane iodide].*—The title base treated with a 10% molar excess of n-butyl iodide and refluxed in ethyl acetate for 4 hours yielded the crystalline butyl quaternary salt on cooling (M.P. 177–180° C.). Recrystallization from ethyl acetate-acetone resulted in a product with a M.P. of 180–181° C.

Example 13

A. *Imide [2-(3-methoxypropyl)-8-oxa-7,9-dimethyl-2-azaspiro[5.4]decane-13-dione].*—Reaction of 20 grams of the anhydride of 4-oxa-3,5-dimethylcyclohexane-1-carboxy-1-acetic acid with 10 gm. of 3-methoxypropylamine and ring closure at 180° C. for one hour, followed by vacuum distillation, yielded 25.4 gm. (94% yield) of the title imide, with a boiling point of 118–122° C./0.18 mm.

B. *Base [2-(3-methoxypropyl)-8 - oxa-7,9-dimethyl-2-azaspiro[5.4]decane].*—Reduction of 15 gm. of the imide from A above with lithium aluminum hydride yielded 12 gm. (90% yield) of the title base, with a boiling point of 70–72° C./0.08 mm.

C. *Base hydrochloric.*—Solution of the base from B in absolute ether and bubbling in gaseous hydrogen chloride yielded the hydrochloride (M.P. 190–191° C.).

D. *Base methiodide.*—Solution of the base in ethyl acetate, refluxing 10 minutes with a 10% molar excess of methyl iodide, cooling and addition of anhydrous ether, yielded the methiodide (M.P. 131–132° C.). Recrystallization from acetone-ether resulted in a product with a M.P. of 131.5–132° C.

The foregoing examples are intended to be illustrative only and are by no means restrictive of the large number of compounds that can be made from the novel intermediates of the present invention. The large number of classes of primary amines which were investigated and found to undergo the desired reactions to yield the novel thiaza and oxazaspiro diones and thiaza and oxazaspiranes are testimony to this fact.

The large number of permutations possible with the disclosed processes is evident and can readily be illustrated further. For example, 3-thiacyclopentane-1,1-diacetic acid was obtained as outlined in Example 2 and melted at 159–160° C. Or, reaction of the anhydride from Example 3 with 2-phenylethylamine yielded the desired imide, 2-(2-phenylethyl) - 8-oxa-7,9-dimethyl-2-azaspiro[5.4]decane-1,3-dione (B.P. 141–143° C./0.01 mm.); reduction yielded the corresponding oxazaspirane base (B.P. 116–118° C./0.025 mm.); the base was salted to form the hydrochloride (M.P. 236–237° C.), the methiodide (M.P. 159–160° C.) and the decyl iodide (M.P. 143–144° C.). Illustrative of other compounds within the scope of the present invention are 2-(2-chlorophenylethyl)-8-thia-2-azaspiro[5.4]decane-1,3-dione;
2-allyl-8-oxa-7,9-diphenyl-2-azaspiro[5.4]decane-1,3-dione;
2-(4-isopropylphenyl)-8-thia-2-azaspiro[4.4]nonane-1,3-dione;
2-(1-naphthyl)-8-thia-2-azaspiro[4.4]nonane-1,3-dione;
2-(3-pyridylmethyl)-8-oxa-2-azaspiro[4.4]nonane-1,3-dione;
2-(6-quinolyl)-8-thia-2-azaspiro[4.4]nonane-1,3-dione;
2-(2-furylmethyl)-8-thia-2-azaspiro[4.4]nonane-1,3-dione;
2-allyl-8-oxa-7-methyl-9-phenyl-2-azaspiro[5.4]decane-1,3-dione;
2-allyl-8-oxa-7-methyl-2-azaspiro[5.4]decane-1,3-dione;
2-allyl-8-oxa-7-phenyl-2-azaspiro[5.4]decane-1,3-dione;
2-allyl-8-oxa-2-azaspiro[5.4]decane-1,3-dione;
and the corresponding bases of these diones.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. 2-(3-dimethylaminopropyl)-8-oxa - 7,9 - dimethyl-2-azaspiro[5.4]decane-1,3-dione.
2. 3-(3-dimethylaminopropyl)-8,10 - dimethyl - 9-oxa-3-azaspiro[5.5]undecane-2,4-dione.
3. 2-(3-morpholinopropyl) - 7 - thia-2-azaspiro[4.4]nonane-1,3-dione.
4. 2-allyl-7-thia-2-azaspiro[4.4]nonane-1,3-dione.
5. 2-allyl-8-oxa-7,9-dimethyl - 2 - azaspiro[5.4]decane-1,3-dione.
6. 2-allyl-8-oxa-7,9-diphenyl - 2 - azaspiro[5.4]decane-1,3-dione.
7. A compound selected from the group consisting of (1) an imide of the formula

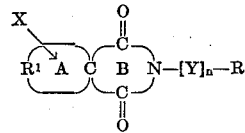

wherein A is a ring of at least 5 ring atoms, all of the ring atoms being carbon atoms except for $R^1$; $R^1$ is selected from the group consisting of oxygen and sulphur; X is selected from the group consisting of at least one of hydrogen, lower alkoxy, lower alkyl, lower alkenyl, cyclo lower alkyl and monocarbocyclic aryl; B is a saturated ring of 5–6 ring atoms, the ring atoms in ring B other than the nitrogen atom being carbon atoms; Y is selected from the group consisting of alkylene and alkenylene of up to 6 carbon atoms; $n$ is 0–1; and R is selected from the group consisting of lower alkyl, lower alkenyl, cyclo lower alkyl, cyclo lower alkenyl, lower and di-lower alkyl and alkenyl amino, saturated heterocyclic selected from the group consisting of morpholino, piperidino, pyrrolidino, piperazino, tetrahydrofuryl and their lower alkyl and alkenyl substituted derivatives, monocarbocyclic aryl, naphthyl, pyridyl, quinolyl, furyl and lower alkoxy; (2) the non-toxic acid addition salts of (1); and (3) the non-toxic quaternary salts of (1).

References Cited by the Examiner
UNITED STATES PATENTS

| | | | |
|---|---|---|---|
| 2,715,130 | 8/1955 | Krimmel | 260—345 |
| 2,976,296 | 3/1961 | Schoor et al. | 260—237 |
| 3,106,552 | 10/1963 | Grogen et al. | 260—247 |
| 3,150,143 | 9/1964 | Grogen et al. | 260—293 |
| 3,170,932 | 2/1965 | Jucker et al. | 260—326 |

OTHER REFERENCES

Bardhan, "J. Chem. Soc." (1928), pages 2597–98 (part II).

Desal, "J. Chem. Soc." (1931), page 1224 (January–June).

NICHOLAS S. RIZZO, *Primary Examiner.*

IRVING MARCUS, *Examiner.*

UNITED STATES PATENT OFFICE
CERTIFICATE OF CORRECTION

Patent No. 3,256,276                          June 14, 1966

Charles H. Grogan et al.

It is hereby certified that error appears in the above numbered patent requiring correction and that the said Letters Patent should read as corrected below.

Column 7, line 75, for "noane" read -- nonane --; column 8, line 8, for "done" read -- dione --; line 42, for "1 3" read - 1,3 --.

Signed and sealed this 26th day of September 1967.

(SEAL)
Attest:

ERNEST W. SWIDER                            EDWARD J. BRENNER
Attesting Officer                                 Commissioner of Patents